US012581563B2

(12) United States Patent
Laselva et al.

(10) Patent No.: US 12,581,563 B2
(45) Date of Patent: Mar. 17, 2026

(54) HANDLING OF DATA TRANSMISSION

(71) Applicant: NOKIA TECHNOLOGIES OY, Espoo (FI)

(72) Inventors: Daniela Laselva, Klarup (DK); Samuli Turtinen, Ii (FI); Jussi-Pekka Koskinen, Oulu (FI); Nuno Pratas, Gistrup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 200 days.

(21) Appl. No.: 18/248,342

(22) PCT Filed: Sep. 27, 2021

(86) PCT No.: PCT/IB2021/058801
§ 371 (c)(1),
(2) Date: Apr. 7, 2023

(87) PCT Pub. No.: WO2022/074502
PCT Pub. Date: Apr. 14, 2022

(65) Prior Publication Data
US 2023/0389117 A1      Nov. 30, 2023

Related U.S. Application Data

(60) Provisional application No. 63/089,312, filed on Oct. 8, 2020.

(51) Int. Cl.
*H04W 76/27*      (2018.01)
(52) U.S. Cl.
CPC .................................. *H04W 76/27* (2018.02)

(58) Field of Classification Search
CPC . H04W 76/27; H04W 28/0278; H04W 72/21; H04W 74/08
See application file for complete search history.

(56) References Cited

U.S. PATENT DOCUMENTS

| | | | |
|---|---|---|---|
| 10,356,837 B2 | 7/2019 | Chen | |
| 10,397,833 B2 | 8/2019 | Lee et al. | |
| 2015/0289292 A1 | 10/2015 | Sun et al. | |

(Continued)

FOREIGN PATENT DOCUMENTS

| | | |
|---|---|---|
| CN | 104219712 B | 11/2018 |
| EP | 3691400 A1 | 8/2020 |

(Continued)

OTHER PUBLICATIONS

Intel Corporation, Radio bearer configuration for SOT considering UE context relocation and CU/DU split, Aug. 17-28, 2020, 3GPP TSG RAN WG2 Meeting #111-e, R2-2006714, pp. 1-6 (Year: 2020).*

(Continued)

*Primary Examiner* — Farid Seyedvosoghi
(74) *Attorney, Agent, or Firm* — ALSTON & BIRD LLP

(57) ABSTRACT

Systems, methods, apparatuses, and computer program products for handling data transmission such as non-small data transmission (SDT) in conjunction with SDT. A method may include determining an availability of non-small data transmission, non-SDT, data. The method may also include indicating to a network element, a result of the determining.

23 Claims, 11 Drawing Sheets

Determine an availability of non-small data transmission, non-SDT, data 700

Indicate to a network element, a result of the determining 705

(56)                    References Cited

U.S. PATENT DOCUMENTS

| | | | |
|---|---|---|---|
| 2017/0099660 A1 | 4/2017 | Oh | |
| 2017/0251516 A1 | 8/2017 | Bangolae et al. | |
| 2022/0095410 A1 | 3/2022 | Shih et al. | |
| 2022/0210868 A1* | 6/2022 | Park | H04W 76/27 |
| 2023/0164773 A1* | 5/2023 | Alfarhan | H04W 74/0833 |
| | | | 370/329 |
| 2023/0239858 A1 | 7/2023 | Shi et al. | |
| 2023/0276530 A1* | 8/2023 | Jeon | H04W 36/06 |
| | | | 370/329 |

FOREIGN PATENT DOCUMENTS

| | | |
|---|---|---|
| KR | 10-2020-0129196 | 10/2020 |
| KR | 10-2021-0023589 | 2/2021 |
| WO | 2020/087280 A1 | 5/2020 |
| WO | 2020/088097 A1 | 5/2020 |
| WO | 2021/136474 A1 | 7/2021 |
| WO | 2021/179317 A1 | 9/2021 |
| WO | 2021/207317 A1 | 10/2021 |
| WO | 2021/213505 A1 | 10/2021 |
| WO | 2022/010209 A1 | 1/2022 |
| WO | 2022/014972 A1 | 1/2022 |
| WO | 2022/036507 A1 | 2/2022 |
| WO | 2022/060005 A1 | 3/2022 |
| WO | 2022/061872 A1 | 3/2022 |
| WO | WO 2022/047391 A1 | 3/2022 |
| WO | 2022/075782 A1 | 4/2022 |

OTHER PUBLICATIONS

Intel Corporation (3GPP TSG RAN WG2 Meeting #111, Aug. 17-28, 2020, R2-2006714 (Year: 2020).*

3rd Generation Partnership Project; Technical Specification Group Radio Access Network; NR; Medium Access Control (MAC) protocol specification (Release 16), 3GPP TS 38.321 v16.1.0, (Jul. 2020), 151 pages.

"3rd Generation Partnership Project; Technical Specification Group Radio Access Network; NR; NR and NG-RAN Overall Description; Stage 2 (Release 16)", 3GPP TS 38.300 v16.2.0, (Jul. 2020), 148 pages.

"3rd Generation Partnership Project; Technical Specification Group Radio Access Network; NR; Radio Resource Control (RRC) protocol specification (Release 16)", 3GPP TS 38.331 v16.1.0, (Jul. 2020), 906 pages.

"3rd Generation Partnership Project; Technical Specification Group Radio Access Network; NR; User Equipment (UE) radio access capabilities (Release 16)", 3GPP TS 38.306 v16.1.0, (Jul. 2020), 106 pages.

Intel Corporation, "Radio Bearer Configuration for SDT Considering UE Context Relocation and CU/DU Split", 3GPP TSG RAN WG2 Meeting #111-e, R2-2006714, (Aug. 17-28, 2020), 6 pages.

Intel Corporation, "SDT Mechanism on RRC/Non-RRC Based Approaches and RACH Requirements", 3GPP TSG RAN WG2 Meeting #111-e, R2-2006713, (Aug. 17-28, 2020), 10 pages.

InterDigital, "RACH-Based UL Small Data Transmission Procedure", 3GPP RAN WG2 Meeting #111-e, R2-2007613, (Aug. 17-28, 2020), 4 pages.

International Search Report and Written Opinion for Patent Cooperation Treaty Application No. PCT/IB2021/058801 dated Dec. 21, 2021, 16 pages.

Qualcomm Incorporated, "RACH Based NR Small Data Transmission", 3GPP TSG-RAN WG2 Meeting #111e, R2-2007540, (Aug. 17-28, 2020), 6 pages.

ZTE Corporation, "Work Item on NR Smalldata Transmissions in Inactive State", 3GPP TSG RAN Meeting #86, RP-193252, (Dec. 9-12, 2019), 4 pages.

Decision to Grant for Japanese Application No. 2023-521563 dated Dec. 9, 2024, 4 pages.

Decision to Grant for Japanese Application No. 2025-019010 dated Apr. 24, 2025, 4 pages.

Ericsson, "Draft Tp for Small UL Data Transmission in RRC_Inactive", 3GPP TSG-RAN WG2 #97, R2-1702339, (Feb. 13-17, 2017), 3 pages.

Examination Report for Australian Application No. 2021356262 dated Jun. 6, 2024, 4 pages.

Examination Report for Australian Application No. 2021356262 dated Mar. 25, 2024, 5 pages.

First Examination Report for Indian Application No. 202327026721 dated May 7, 2024, 7 pages.

Interdigital, "Report for Rel-16 (NR-U, Power Savings and 2-step RACH) and Rel-17 (IIoT and Small Data)", 3GPP TSG-RAN WG2 Meeting #111-e, R2-2008124, (Aug. 17-28, 2020), 25 pages.

Office Action for Japanese Application No. 2023-521563 dated May 23, 2024, 10 pages.

Office Action for Japanese Application No. 2023-521563 dated Oct. 22, 2024, 5 pages.

OPPO, "The Conditions for Small Data Transmission in Inactive State", 3GPP TSG-RAN WG2 #111-e, R2-2006837, (Aug. 2020), 2 pages.

Samsung, "Control Plane Aspects of Sdt", 3GPP TSG-RAN2 Meeting #112 Electronic, R2-2009095, (Nov. 2-13, 2020), 4 pages.

ZTE Corporation et al., "Details of RRC-based Idt", 3GPP TSG-RAN2 #111e, R2-2007449, (Aug. 17-28, 2020), 18 pages.

* cited by examiner

Configure a user equipment to trigger small data transmission,SDT, for SDT data and indicate presence of non-SDT data    800

Receive a SDT data transmission comprising the SDT data    805

Receive an indication from the user equipment indicating the presence of non-SDT data    810

HANDLING OF DATA TRANSMISSION

CROSS-REFERENCE TO RELATED APPLICATIONS

This application is a national phase entry of International Application No. PCT/IB2021/058801, filed Sep. 27, 2021, which claims benefit of U.S. Provisional Application No. 63/089,312, filed Oct. 8, 2020, the contents of which are hereby incorporated by reference in their entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for handling data transmission such as non-small data transmission (SDT) in conjunction with SDT.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bit rates on the order of 10-20 Gbit/s or higher, and will support at least enhanced mobile broadband (eMBB) and ultra-reliable low-latency communications (URLLC) as well as massive machine type communications (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, high data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

SUMMARY

Some example embodiments are directed to a method. The method may include determining an availability of non-small data transmission, non-SDT, data. The method may also include indicating to a network element, a result of the determining.

Other example embodiments are directed to an apparatus that may include at least one processor and at least one memory including computer program code. The at least one memory and the computer program code are configured, with the at least one processor to cause the apparatus at least to determine an availability of non-small data transmission, non-SDT, data. The apparatus may also be caused to indicate to a network element, a result of the determining.

Other example embodiments are directed to an apparatus. The apparatus may include means for determining an availability of non-small data transmission, non-SDT, data. The apparatus may also include means for indicating to a network element, a result of the determining.

In accordance with other example embodiments, a non-transitory computer readable medium may be encoded with instructions that may, when executed in hardware, perform a method. The method may include determining an availability of non-small data transmission, non-SDT, data. The method may also include indicating to a network element, a result of the determining.

Other example embodiments may be directed to a computer program product that performs a method. The method may include determining an availability of non-small data transmission, non-SDT, data. The method may also include indicating to a network element, a result of the determining.

Other example embodiments may be directed to an apparatus that may include circuitry configured to determine an availability of non-small data transmission, non-SDT, data. The apparatus may also include circuitry configured to indicate indicating to a network element, a result of the determining.

Certain example embodiments may be directed to a method. The method may include configuring a user equipment to trigger small data transmission, SDT, for SDT data and indicate presence of non-SDT data. The method may also include receiving a SDT data transmission comprising the SDT data. The method may further include receiving an indication from the user equipment indicating the presence of non-SDT data.

Other example embodiments may be directed to an apparatus. The apparatus may include at least one processor and at least one memory including computer program code. The at least one memory and computer program code may be configured to, with the at least one processor, cause the apparatus at least to configure a user equipment to trigger small data transmission, SDT, for SDT data and indicate presence of non-SDT data. The apparatus may also be caused to receive a SDT data transmission comprising the SDT data. The apparatus may further be caused to receive an indication from the user equipment indicating the presence of non-SDT data.

Other example embodiments may be directed to an apparatus. The apparatus may include means for configuring a user equipment to trigger small data transmission, SDT, for SDT data and indicate presence of non-SDT data. The apparatus may also include means for receiving a SDT data transmission comprising the SDT data. The apparatus may further include means for receiving an indication from the user equipment indicating the presence of non-SDT data.

In accordance with other example embodiments, a non-transitory computer readable medium may be encoded with instructions that may, when executed in hardware, perform a method. The method may include configuring a user equipment to trigger small data transmission, SDT, for SDT data and indicate presence of non-SDT data. The method may also include receiving a SDT data transmission comprising the SDT data. The method may further include receiving an indication from the user equipment indicating the presence of non-SDT data.

Other example embodiments may be directed to a computer program product that performs a method. The method may include configuring a user equipment to trigger small data transmission, SDT, for SDT data and indicate presence of non-SDT data. The method may also include receiving a SDT data transmission comprising the SDT data. The method may further include receiving an indication from the user equipment indicating the presence of non-SDT data.

Other example embodiments may be directed to an apparatus that may include circuitry configured to configure a user equipment to trigger small data transmission, SDT, for SDT data and indicate presence of non-SDT data. The apparatus may also include circuitry configured to receive a SDT data transmission comprising the SDT data. The apparatus may further include circuitry configured to receive an indication from the user equipment indicating the presence of non-SDT data.

BRIEF DESCRIPTION OF THE DRAWINGS

For proper understanding of example embodiments, reference should be made to the accompanying drawings, wherein:

FIG. 1($b$) illustrates an example of a 2-step based SDT signaling diagram.

FIG. 1($c$) illustrates an example of a configured grant (CG) SDT signaling diagram.

FIG. 5($b$) illustrates a signaling diagram of a resume procedure after SDT abort due to the presence of SDT and non-SDT data, according to certain example embodiments.

FIG. 6($b$) illustrates another signaling diagram of buffering of non-SDT data, according to certain example embodiments.

FIG. 9($b$) illustrates another apparatus, according to certain example embodiments.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for handling data transmission such as non-small data transmission (SDT) in conjunction with SDT.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as merely illustrative of the principles and teachings of certain example embodiments, and not in limitation thereof.

Figures 1A, 1B, 1C:
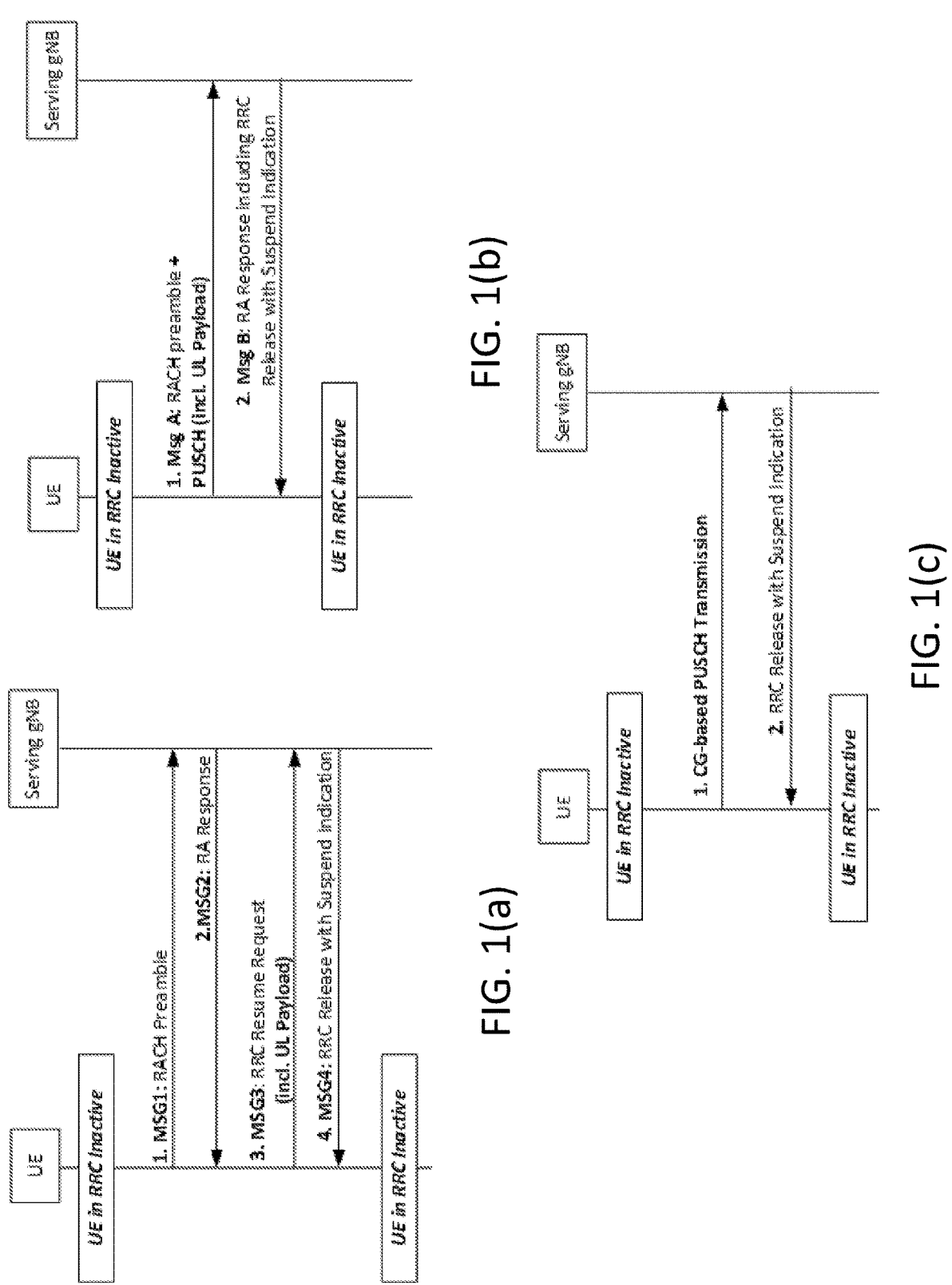
FIG. 1($a$) illustrates an example of a 4-step based small data transmission (SDT) signaling diagram.

FIG. 1($a$) illustrates an example of a 4-step based small data transmission (SDT) signaling diagram. Further, FIG. 1($b$) illustrates an example of a 2-step based SDT signaling diagram, and FIG. 1($c$) illustrates an example of a configured grant (CG) based SDT signaling diagram. $3^{rd}$ Generation Partnership Project (3GPP) describes various solutions for enabling SDT of uplink (UL) user plane (UP) data in a radio resource control (RRC) inactive state of a 5G new radio (NR) system. As illustrated in FIG. 1($a$), 3GPP describes a 4-step random access channel (RACH) based SDT. Here, the UP data may be transmitted in Msg3 of a 4-step RACH procedure. For example, a small data payload may be multiplexed with, for example, an RRC connection resume request message in Msg3, for instance, in a Medium Access Control (MAC) Protocol Data Unit (PDU).

As illustrated in FIG. 1($b$), 3GPP describes a 2-step RACH based SDT. In this procedure, the UP data transmission may occur with MsgA of a 2-step RACH procedure, and specifically on the physical uplink shared channel (PUSCH) resources. The PUSCH resources may be preconfigured by the gNB and broadcasted in system information with associated physical transmission parameters.

Additionally, as illustrated in FIG. 1($c$), 3GPP describes a CG based SDT. Here, a UE in RRC_connected state may receive a CG type1 configuration. According to certain example embodiments, this configuration may indicate the specific pre-configured PUSCH resources to be used for UL data transmission in RRC_inactive state as long as the timing alignment is valid.

Figure 2:
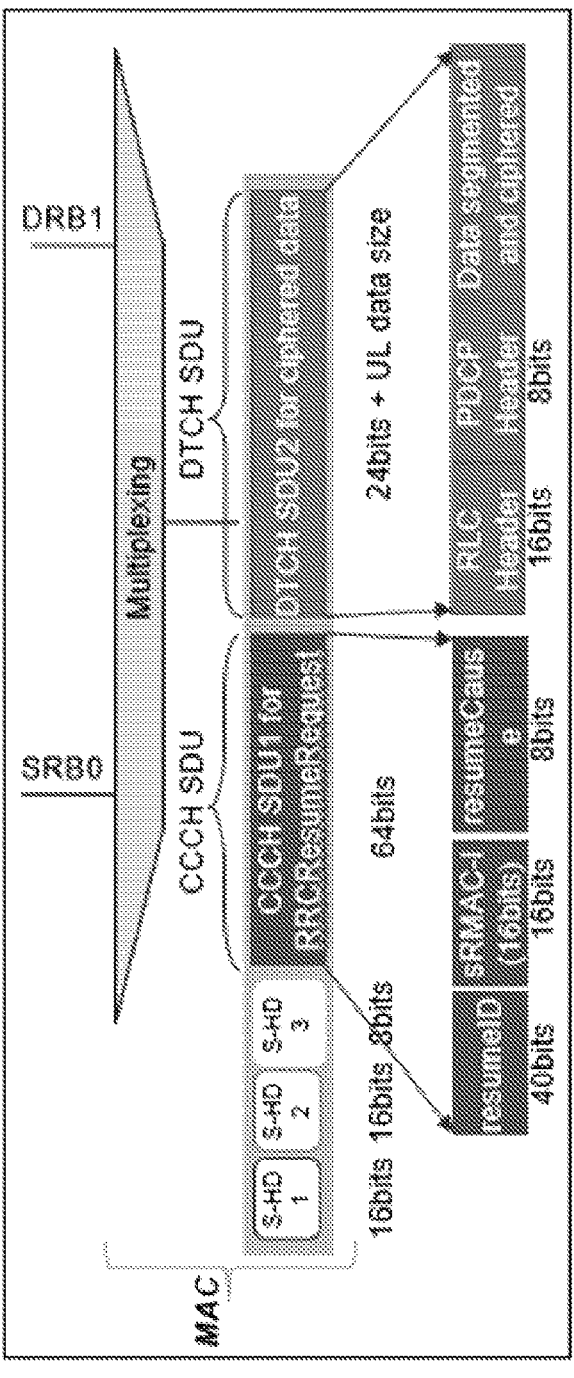
FIG. 2 illustrates an example content of an uplink medium access control protocol data unit.

In certain cases, the RRC-based approach illustrated in FIGS. 1($a$)-1($c$) may be assumed. For instance, the UE may send an RRC message including information about the UE identity and its authentication token (i.e., MAC-I). In FIGS. 1($a$)-1($c$), it may be assumed that the RRC resume request message is used for this purpose, and FIG. 2 illustrates an example content corresponding UL MAC PDU. In a RRC-less approach, it may be assumed that the RRC layer does not need to be involved in SDT operations, and the necessary information, such as user equipment (UE) identity and UE authentication token, may be provided by the UE in the MAC header or as a MAC control element (CE). In addition, a data volume threshold may be used for the UE to decide whether to perform SDT or a resume procedure.

According to 3GPP, an SDT may be configured by the network on a per data radio bearer (DRB) basis. A minimum number of DRBs that a UE may support may be 16 without duplication, and 8 per MAC entity with duplication. However, up to 29 DRBs may be added in DRB-toAddModList, where each DRB may be identified by its DRB-identity. In addition, the configured DRBs may be suspended by a UE upon reception of an RRC release message with Suspend-Config. Further, a buffer size report (BSR) sent via a MAC CE from the UE to the gNB may indicate the amount of pending data in the UL buffer allowed for an explicit buffer size bit field per logical channel group (LCG) in NR. Additionally, dedicated MAC CE formats may allow to send a short (truncated) BSR and a long (truncated) BSR, indicating the buffer size index corresponding to the actual buffer size levels (in bytes) for one or more logical channel groups LCGs. The network (gNB) may then schedule UL resources to each UE based on the quality of service (QoS) characteristics of the corresponding DRBs as per the BSR.

In some instances, the logical channel group (LCG) may be used for constructing a consolidated reporting of the buffer status for signaling overhead efficiency. For example, the buffer status may be reported aggregating the data across a group of logical channels (LCHs) assigned to the same LCG. On the contrary, the resources allocation may be performed according to the logical channels. The mapping of a radio bearer and logical channel to a LCG may be performed at radio bearer setup time by the gNB via RRC signaling, and may be based on the corresponding QoS attributes of the radio bearers. Current BSR triggers may include a situation where new data arrives in previously empty buffers, that higher priority data arrives after the UE has already sent a BSR and is waiting for a grant, that the UE needs to update the gNB about the status of buffers (e.g., periodically according to a periodicBSR-timer), and that a BSR retransmission may be sent according to retxBSR-timer to provide BSR robustness.

Additionally, 3GPP describes that the UE AS context may be stored at a UE while in RRC_inactive state, and at the last serving gNB (e.g., anchor gNB or old NG-RAN node). The UE AS context may include the current RRC context, including the suspended RRC configuration and UE radio capability. The UE AS context may also include the current AS security context, including UE security capabilities and security information. In addition, the UE AS context may include the current configuration fo the suspended DRBs, including the packet data convergence protocol (PDCP) state including robust header compression (ROHC) state, service data application protocol (SDAP) configuration, and radio link control (RLC) configuration. In addition, the UE AS context may include cell radio network temporary identifier (C-RNTI) used in the source Pcell, the cell identity, and the physical cell identity (PCI) of the source Pcell.

Figure 3:
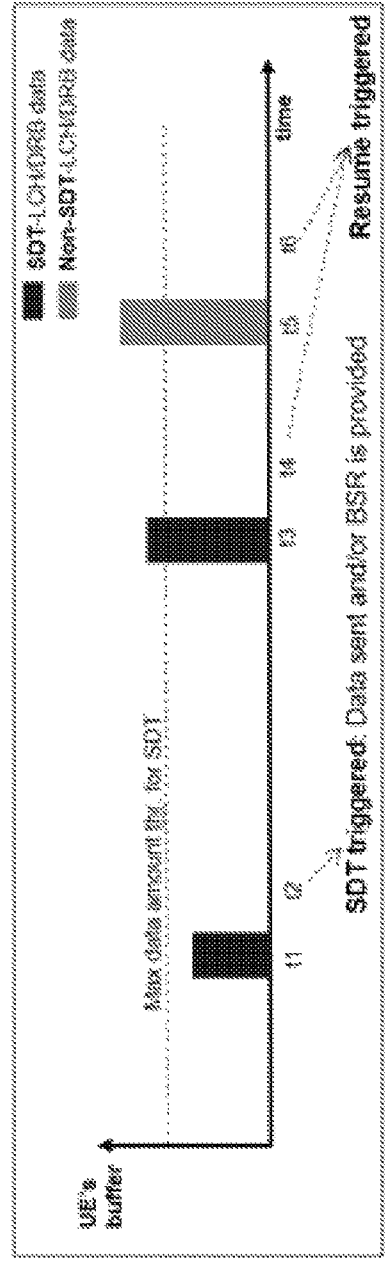
FIG. 3 illustrates an example resume procedure for enabling data transfer.

In certain cases, the reception of an RRC release with SuspendConfiguration may trigger the UE to move from the RRC connected to RRC inactive state, and in turn to suspend the DRBs that are currently configured. According to radio access network 2 (RAN2), the SDT feature may be configured on a per DRB basis. This may suggest that the presence of traffic belonging to the DRB(s) configured with the SDT can trigger an SDT. These DRBs may be referred to as SDT-DRB. In this case, SDT may be selected if the SDT selection condition(s) are met. Further, at least a selection condition based on the data amount may be defined as, for example, the total data volume of SDT-DRBs being below the maximum data volume threshold defined by the network for SDT in order to select SDT. On the contrary, any other suspended DRBs not configured with SDT (referred to as non-SDT DRB) may have to initiate a resume procedure for enabling the data transfer. This scenario is shown in FIG. 3, which illustrates an example resume procedure for enabling data transfer.

Figure 4:
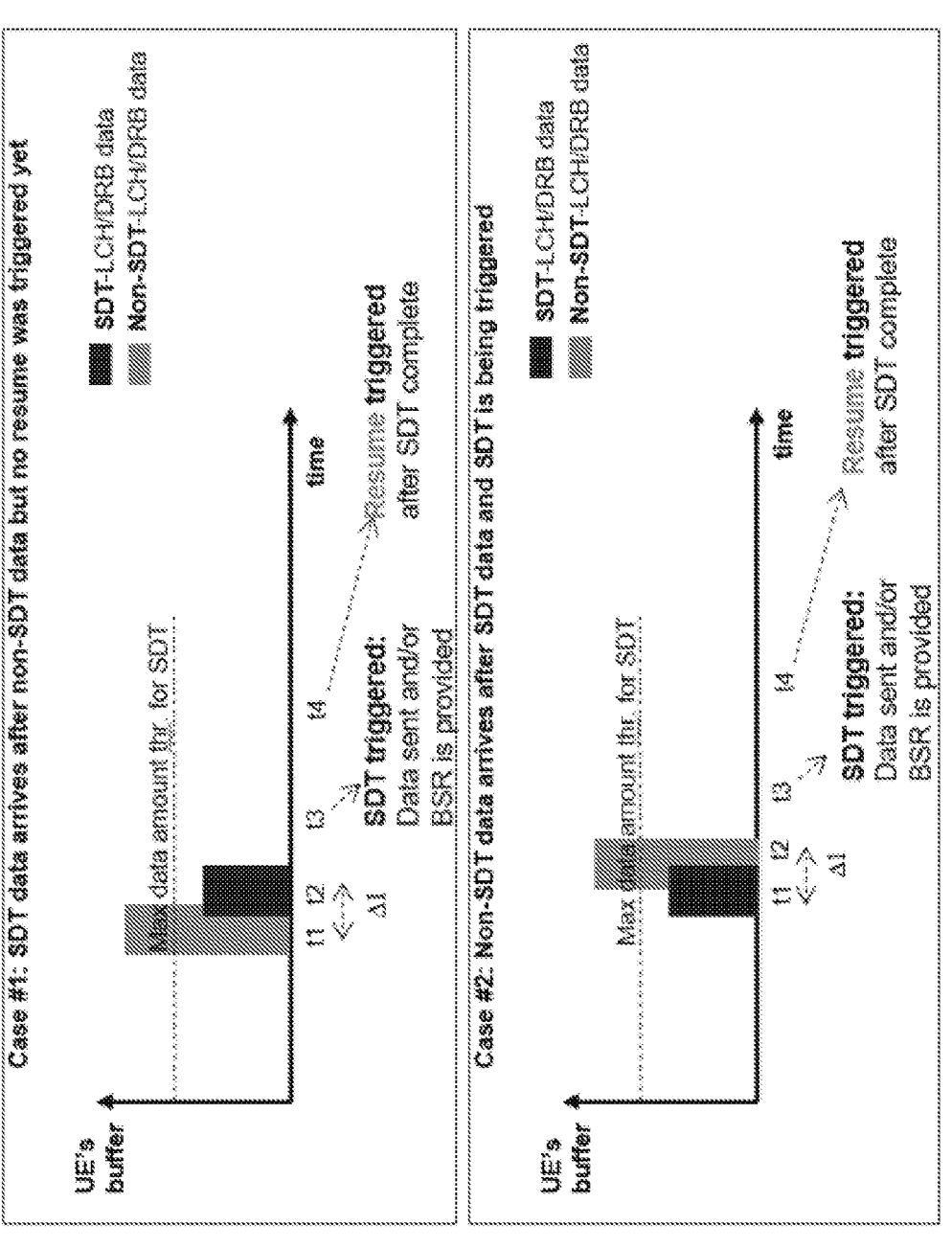
FIG. 4 illustrates an example of cases with SDT and non-SDT data simultaneously present in the buffer, and a user equipment initiating SDT and resume transmission.

FIG. 4 illustrates an example of cases with SDT and non-SDT data simultaneously present in the buffer, and a user equipment initiating SDT and resume procedure triggered. Although SDT-DRB and non-SDT DRB operations may be straightforward when only a given type of traffic (SDT or non-SDT) is present in the UE's buffer, issues may appear for cases where both data of SDT-DRBs and non-SDT DRBs are/become present in the buffer. For cases in which new data arrives in the UE buffer from an SDT-DRB and a non-SDT DRB almost at the same time, as illustrated in FIG. 4, the current SDT signaling (see FIG. 1) may allow to carry only UL data of the SDT-DRB and/or related information (e.g., the BSR of SDT-DRBs/LCGs). On the contrary, it is open how such signaling may provide indication of the presence of other traffic that is not meant to be served via SDT. As such, certain example embodiments provide signaling extensions to handle cases of concurrent presence of SDT and non-SDT data. Without such extensions, the transfer of data of non-SDT DRB may incur extra delays whenever the data is generated in conjunction with SDT-DRB data, as illustrated in FIG. 4.

Certain example embodiments may enable the UE in RRC_inactive state to handle cases where SDT and non-SDT data may be simultaneously present in the UE's buffer at the time it is initiating a SDT. For instance, in certain example embodiments, when the SDT procedure has been triggered by the UE and data becomes available in a non-SDT DRB, the UE may indicate the presence of non-SDT DRB. The indication by the UE may be accomplished by various means or options.

For example, in certain example embodiments, a new BSR trigger may be defined, which does not account the priority of the LCHs, but BSR may be triggered based on the data becoming available on a non-SDT DRB when the SDT procedure is ongoing. In this situation, the existing BSR format may be used for the reporting. For example, the network (NW) may use the LCG with data information to deduce there is data in a non-SDT DRB. Alternatively, a new indication in the BSR (or a new format) may be defined, which indicates the data availability in the non-SDT DRB.

According to other example embodiments, a new MAC CE may be defined to indicate the data availability in the non-SDT DRB. Here, the MAC CE may indicate, for example, the DRB ID/logical channel ID (LCID) of the LCH, amount of data, LCG of the LCH, etc. In certain example embodiments, another option may include SDAP/PDCP/RLC control PDU of the non-SDT DRB multiplexed along with the SDT data to indicate the presence of data in the non-SDT DRB.

In other example embodiments, another option may include triggering a new RRC message that indicates that data became available also to the non-SDT DRB buffer(s). Such RRC message may be a common control channel (CCCH) (SRB0) message that could be multiplexed by the RRC message used for the SDT procedure (e.g., RRCResume), or sent over UL grant addressed to C-RNTI after the C-RNTI has been assigned during the SDT procedure. In addition, the RRC message may indicate, for example, the DRB ID/LCID of the LCH, amount of data, LCG of the LCH, etc.

According to certain example embodiments, an option may include triggering an RRCResume message to be transmitted again with a resume cause of which the NW can deduce there is data in a non-SDT DRB. For instance, the resume cause may be mobile-oriented data (MO-data) (i.e., uplink data), or a new resume cause defined for the purpose.

According to other example embodiments, an option may include the indication for presence of the non-SDT DRB data in the UE buffer triggered in case the data is of higher priority than that of the SDT-DRB data. This may be, for example, based on the LCH priorities in the MAC layer. As described herein, "SDT being triggered" may mean that the UE (e.g., RRC/MAC layer of the UE) has selected SDT based on the detection of the presence of SDT data and the SDT selection conditions (e.g., data threshold), but has not yet initiated the actual SDT (e.g., MsgA/Msg3 of CG transmission). However, the same aspects described above may be applied during an SDT procedure (i.e., the UE has already performed a first actual data transmission) for the case of multi-shot SDT, where one single SDT transaction may include more than one actual data transmission (without transitioning the UE to RRC_connected state).

In certain example embodiments, when the SDT procedure has been triggered by the UE and data becomes available in a non-SDT DRB, the UE may abort the SDT procedure and trigger RRC resume procedure. Alternatively or additionally, this may depend on a priority of the SDT-DRB with data, as compared to the non-SDT DRB with data. For example, if the data of the SDT-DRB has a higher priority, the SDT procedure may be completed by the UE. However, if the data of the non-SDT DRB has a higher priority, the SDT procedure may be aborted.

In other example embodiments, when the SDT procedure has been triggered by the UE and data becomes available in a non-SDT DRB, whether the SDT procedure is aborted or completed by the UE may depend on whether the SDT data has already been transmitted by the UE. For example, if the data of the SDT-DRB has been transmitted, the SDT procedure may be completed by the UE. On the other hand, if the data of the SDT-DRB has not been transmitted, the SDT procedure may be aborted.

According to certain example embodiments, when the SDT procedure has been triggered by the UE and data becomes available in a non-SDT DRB, the UE may buffer the data in the non-SDT DRB until the SDT procedure is completed (i.e., after receiving RRCResume or RRCRelease with supsendConfig from the NW). After receiving the RRCRelease with suspendConfig, the UE may trigger connection resume procedure for the non-SDT DRB data transmission.

According to other example embodiments, when the UE is in RRC_inactive state and configured with SDT and UL data becomes (or is) available for transmission for both SDT-DRB and non-SDT DRB, the UE may trigger regular RRC resume procedure instead of SDT transmission. In certain example embodiments, this may be general in the case where RRC resume procedure is started with data arrival on non-SDT DRB and data on an SDT-DRB becomes available.

In certain example embodiments, the UE implementation may determine whether to re-initiate a new RRC procedure for RRC resume or continue with SDT procedure upon data arrival in non-SDT DRB while the SDT procedure has already been triggered. In other example embodiments, the network may control the UE behavior, which may involve new signaling. For example, the signaling may be for the network to configure the UE about what indication related to the presence of non-SDT data it should report, and when/whether to trigger such report. The signaling may also be for the UE, initiating an SDT to transmit allowed UL data belonging to an SDT-DRB, to indicate to the network the presence of data belonging to a non-SDT DRB according to the network configuration. According to certain example embodiments, if the SDT-DRB(s) are not configured by the network, the UE may determine that all configured DRB(s) are SDT-DRBs, SDT is not allowed, or just default bearer is allowed for SDT.

Figure 5A:
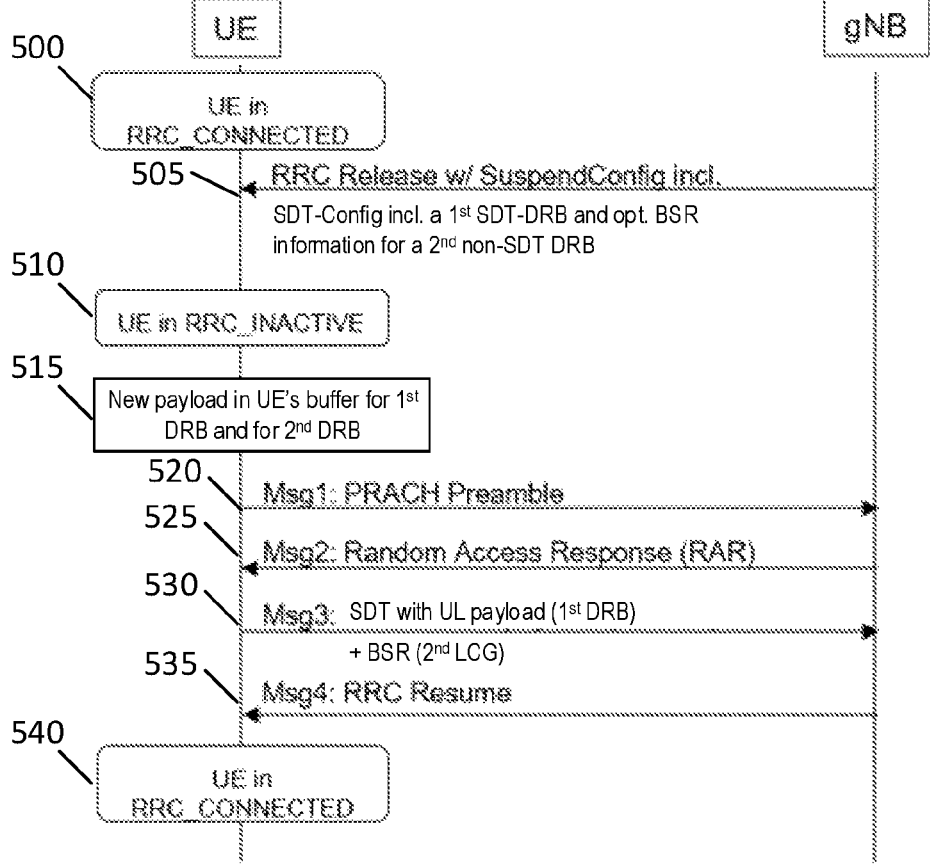
FIG. 5($a$) illustrates a signaling diagram of non-SDT data indication via a BSR along with an SDT, according to certain example embodiments.

FIG. 5(a) illustrates a signaling diagram of non-SDT data indication via a BSR along with an SDT, according to certain example embodiments. As illustrated in FIG. 5(a), at 500, the UE may be in RRC_connected state. At 505, the gNB may send a message with RRC release with SuspendConfig, which may include an SDT configuration. Further, the SDT configuration may include a first SDT-DRB and optional BSR information for a second non-SDT DRB. According to certain example embodiments, a 4-step RACH based SDT procedure may be assumed. However, in other example embodiments, the SDT procedure may use a 2-step RACH based SDT or Configured Grant based SDT. At 510, the UE may change to RRC_inactive state, and at 515, the UE may have a new payload in the UE's buffer for the first DRB and for the second DRB. Further, at 520, the UE may send, via Msg1, a physical random access channel (PRACH) preamble to the gNB. At 525, the gNB may respond by sending, via Msg2, a random access response (RAR) to the UE. At 530, the UE may send, via Msg3, an SDT with an UL payload including the first DRB (Pt SDT-DRB mapped to $1^{st}$ SDT-LCG) along with the BSR ($2^{nd}$ non-SDT DRB mapped to $2^{nd}$ non-SDT LCG). At 535, the gNB may send, via Msg4, an RRC resume indication, and at 540, the UE may revert to RRC_connected state.

Figure 5B:
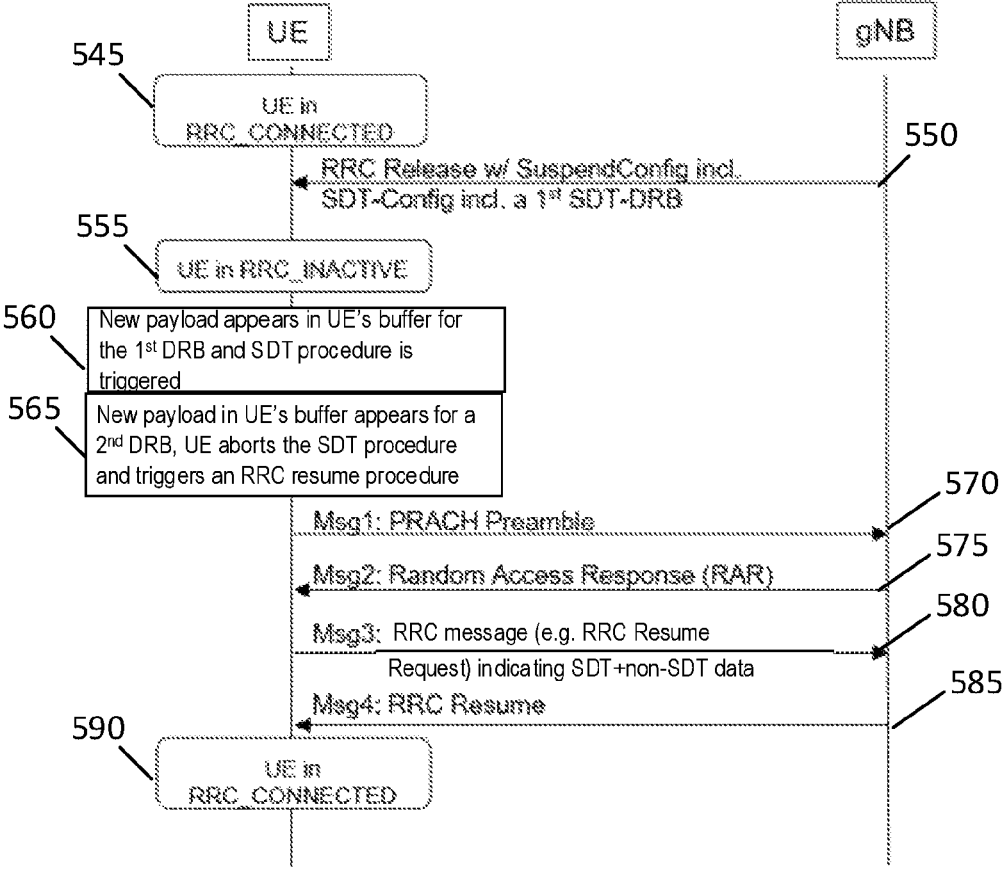

FIG. 5(b) illustrates a signaling diagram of a resume procedure after SDT abort due to the presence of SDT and non-SDT data, according to certain example embodiments. As illustrated in FIG. 5(b), at 545, the UE may be in RRC_connected state. At 550, the gNB may send a message with RRC release with SuspendConfig to the UE. This message may include SDT-configuration, which may include a first SDT-DRB data. According to certain example embodiments, the SDT-configuration may also include configuration/information for aborting an SDT procedure in the presence of both SDT and non-SDT data. Alternatively, in other example embodiments, the configuration/information for aborting an SDT procedure in the presence of both SDT and non-SDT data may be written in specifications. Further, in some example embodiments, the configuration on whether to abort SDT may depend on an SDT procedure type. For example, aborting SDT may depend on whether the SDT procedure is a 4-step, 2-step, or CG-SDT procedure, where, for example, abortion may be applied to the RACH-based SDT procedure and not to the CG-based SDT. At 555, the UE may change to RRC_inactive state. Further, at 560, a new payload may appear in the UE's buffer for the first DRB, and SDT procedure may be triggered. At 565, a new payload in the UE's buffer may appear for a second DRB, at which point the UE may abort the SDT procedure, and trigger an RRC resume procedure. At 570, the UE may send, via Msg1, a PRACH preamble to the gNB. In response, at 575, the gNB may send to the UE, via Msg2, a RAR. At 580, the UE may send to the gNB, via Msg3, a RRC message (e.g., RRC resume request) indicating SDT and non-SDT data. At 585, the gNB may send to UE, via Msg4, an RRC resume message, after which, at 590, the UE may revert to RRC_connected state.

Figure 6A:
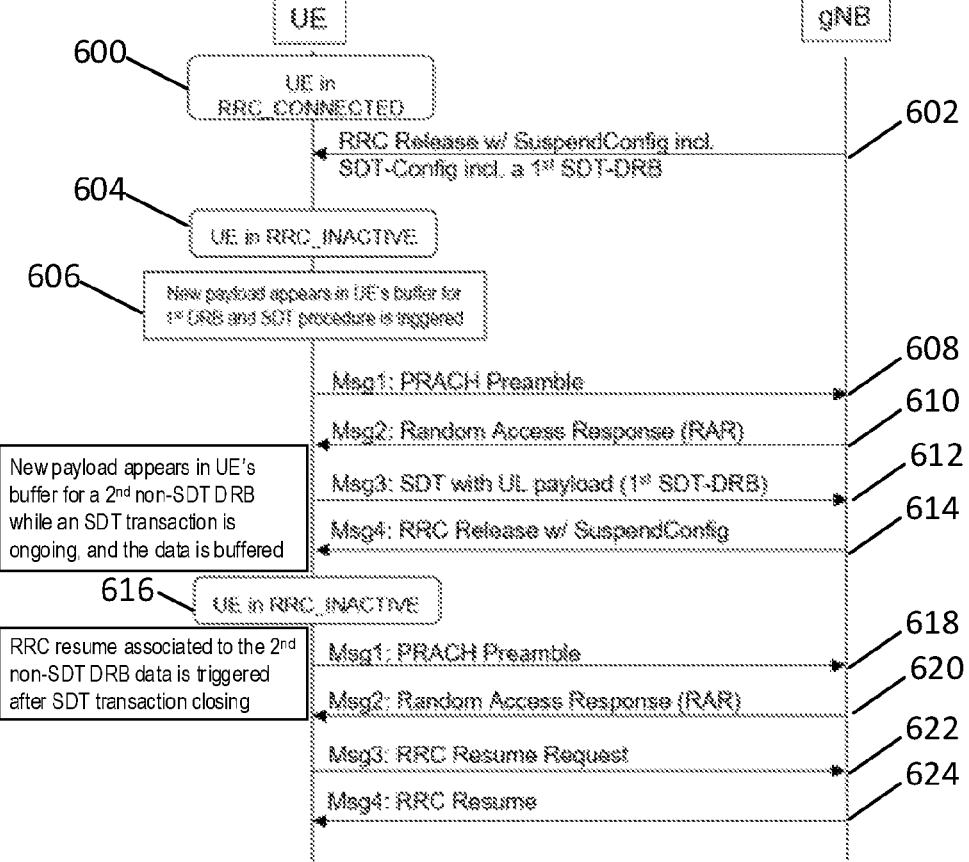
FIG. 6($a$) illustrates a signaling diagram of buffering of non-SDT data, according to certain example embodiments.
Figure 6B:
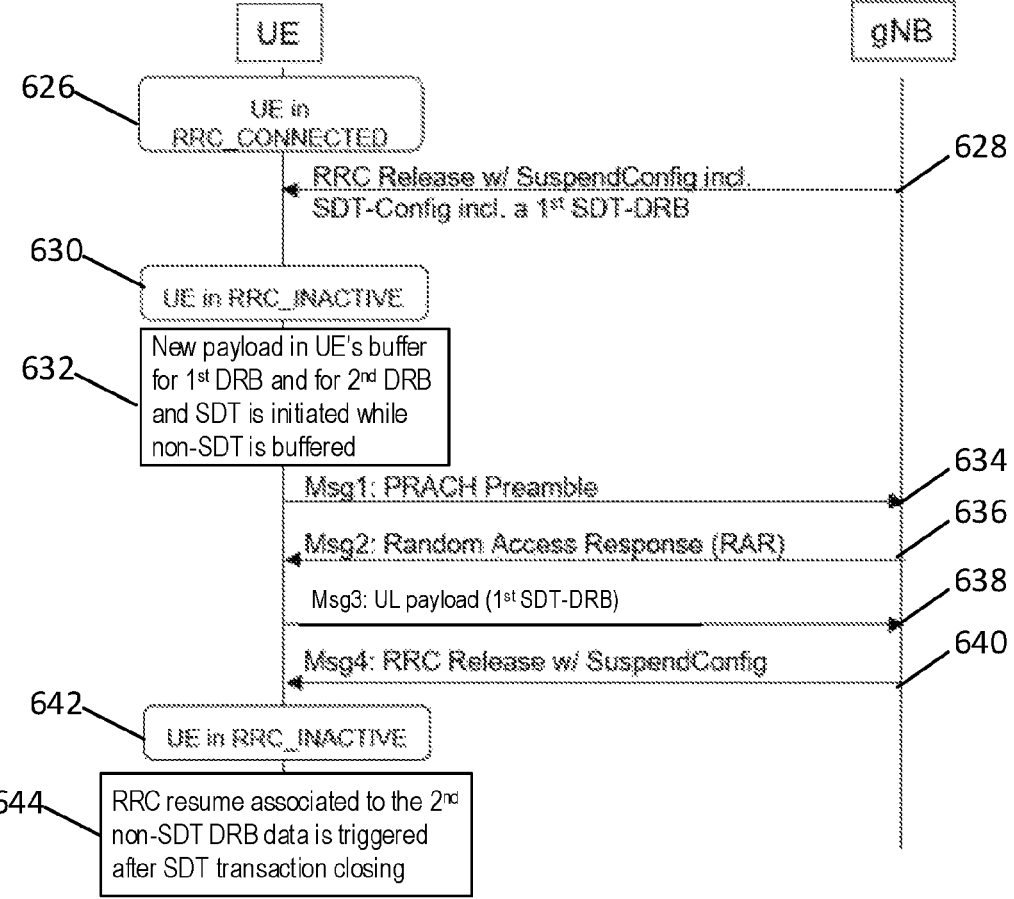

FIG. 6(a) illustrates a signaling diagram of buffering of non-SDT data, according to certain example embodiments. At 600, the UE may be in RRC_connected state. At 602, the gNB may send a message with RRC release with Suspend-Config to the UE. The message may include SDT-configuration including a first SDT-DRB. At 604, the UE may change to RRC_inactive state, and at 606, a new payload may appear in the UE's buffer for the first DRB, and SDT procedure may be triggered. At 608, the UE may send to the gNB, via Msg1, a PRACH preamble. In response, at 610, the gNB may send, via Msg2, a RAR to the UE. Further, at 612, the UE may send to the gNB, via Msg3, SDT with UL payload (first SDT-DRB). At 614, the gNB may send to the UE, via Msg4, RRC release with SuspendConfig. As illustrated in FIG. 6(*a*), during Msg2 to Msg4, a new payload may appear in the UE's buffer for a second non-SDT DRB while an SDT transaction is ongoing. While the SDT transaction is ongoing, the second non-SDT DRB data may be buffered.

At 616, the UE may be in RRC_inactive state. Further, at 618, the UE may send to the gNB, via Msg1, a PRACH preamble. In response, at 620, the gNB may send to the UE, via Msg2, a RAR. During 618 and 624, the RRC resume procedure associated with the second non-SDT DRB data may be triggered after SDT transaction closing. At 622, the UE may send to the gNB, via Msg3, an RRC resume request. In response, at 624, the gNB may send to the UE, via Msg4, a RRC resume response. FIG. 6(*b*) illustrates another signaling diagram of buffering of non-SDT data, according to certain example embodiments. As illustrated in FIG. 6(*b*), at 626, the UE may be in RRC_connected state. At 628, the gNB may send a RRC release with SuspendConfig to the UE. This message may include SDT-configuration including a first SDT-DRB. Further, at 630, the UE may be in RRC_inactive state. At 632, a new payload may appear in the UE's buffer for the first DRB and for the second DRB, and SDT may be initiated while non-SDT is buffered. At 634, the UE may send to the gNB, via Msg1, a PRACH preamble. In response, at 636, the gNB may send to the UE, via Msg2, a RAR. At 638, the UE may send to the gNB, via Msg3, an UL payload (first SDT-DRB). At 640, the gNB may send to the UE, via Msg4, a RRC release with SuspendConfig. Further, at 642, the UE may be in RRC_inactive state. At 644, RRC resume procedure associated with the second non-SDT DRB data may be triggered after the SDT transaction closes.

According to certain example embodiments, the network may configure whether the UE is allowed to use SDT for a DRB/LCG, and whether the UE can send an indication along with an SDT that data present for a DRB/LCG is not allowed to use SDT. In some example embodiments, the UE may be configured not to send the indication for the non-allowed DRB(s)/LCG(s). For example, the LCGs that contain any LCH may not be mapped to an SDT-DRB. In other example embodiments, the UE may be configured to send an indication for a subset of non-SDT DRB/LCG ID(s). In further example embodiments, the UE may be configured whether whenever a trigger to initiate an SDT is met, this would cancel/postpone an ongoing trigger to resume the RRC connection. According to certain example embodiments, the UE may be configured with allowed DRBs/LCGs for SDT, and there may be no separate configuration whether an indication is allowed or not. For example, the UE may be allowed to send the indication.

In certain example embodiments, the UE may be configured (or act as specified) to indicate the presence of data belonging to a non-SDT-LCG via a BSR. In addition, the UE may send such BSR multiplexed with the UL data when initiating an SDT. For instance, in some example embodiments, a new BSR format may be used, and the format may be constructed to differentiate between an SDT-LCG and non-SDT-LCG. According to certain example embodiments, this differentiation may be beneficial by allowing the BSR indication to be interpreted correctly and timely by a new cell/gNB (different from the last serving gNB). Without this feature, the new cell/gNB would otherwise not know whether a certain LCG is allowed to use SDT or not unless/until it has requested and received the UE context from the anchor gNB (last serving gNB). According to further example embodiments, the target gNB may decide a different action based on whether or not the BSR report is for an SDT-LCG. In the former case (i.e., BSR indicating SDT data), the network may decide to serve the data without moving the UE to RRC_connected state (i.e., using subsequent packets during a multi-shot SDT). For this, the network may start scheduling the UE and buffer multiple packets while performing context retrieval. According to certain example embodiments, the network may be able to process the buffered packets once it receives the UE context. In the case where BSR indicates non-SDT data, the network may decide to immediately move the UE to RRC_connected state while performing the anchor relocation procedure.

According to certain example embodiments, the new BSR format may be used if the UE performs SDT to a different cell from the last serving cell. However, in a case where the cell is the same, the UE may use a regular BSR format. According to further example embodiments, dedicated BSR indices (e.g., value 0) may be assigned to indicate that certain reported LCG(s) are non-SDT (i.e., LCG IDs space partitioning). In certain example embodiments, a new indication (e.g., a flag) may be added per LCG to indicate whether the LCG is allowed for SDT. In other example embodiments, the total buffer size of the intended non-SDT LCGs may be reported, indicating it is non-SDT data, but omitting the corresponding LCG ID(s) from the report. In some example embodiments, the omission may be done when the UE performs SDT to a different cell than the last serving cell. According to certain example embodiments, a short BSR format may be used to carry the buffer size index and a non-SDT LCG ID. Further, in other example embodiments, a BSR format may be used to carry at least two buffer size indices corresponding to at least one non-SDT LCG ID.

According to certain example embodiments, the UE may be configured (or act as specified) to indicate the presence of data belonging to a non-SDT-LCG via a (new) RRC message, and send such RRC message multiplexed with the UL data when initiating an SDT. According to other example embodiments, the (new) RRC message may extend the RRC resume request message and include an additional indication that the cause of the transmission is "MO-SDT+non-SDT data present," or similarly "MO-SDT+Resume Request," or the like. According to further example embodiments, the RRC message may include the UEs' UL data amounts for non-SDT DRBs and/or SDT DRBs.

Figure 7:
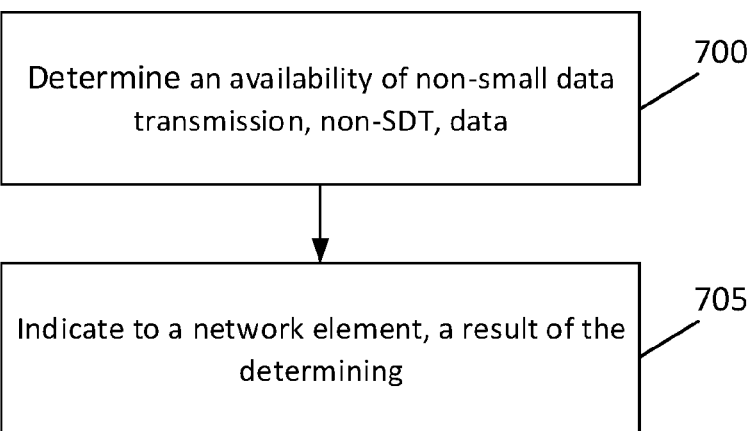
FIG. 7 illustrates a flow diagram of a method, according to certain example embodiments.

FIG. 7 illustrates a flow diagram of a method, according to certain example embodiments. In certain example embodiments, the flow diagram of FIG. 7 may be performed by a network entity or network node in a 3GPP system, such as LTE or 5G-NR. For instance, in an example embodiment, the method of FIG. 7 may be performed by a UE, for instance similar to apparatuses 10 or 20 illustrated in FIGS. 9(*a*) and 9(*b*).

According to certain example embodiments, the method of FIG. 7 may include, at 700, determining an availability of non-small data transmission, non-SDT, data. The method may also include, at 705, indicating to a network element, a result of the determining.

According to certain example embodiments, the method may also include determining an availability of small data transmission, SDT, data, and triggering a SDT procedure when the SDT data is determined to be available. According to some example embodiments, the determining the availability of the non-SDT data may be performed while the SDT procedure is ongoing or upon initiation of the SDT procedure. According to other example embodiments, the method may further include triggering a connection resume procedure when the non-SDT data is determined to be available. According to further example embodiments, the method may also include performing an SDT to the network element with the SDT data.

In certain example embodiments, the determining whether non-SDT data is available while the SDT procedure is ongoing may include determining that non-SDT data is available. In other example embodiments, the indicating to the network element the result of the determining may include indicating presence of the non-SDT data. In some example embodiments, presence of the non-SDT data may be indicated during the SDT procedure. In further example embodiments, the indicating to the network element the result of the determining may be performed via one of a buffer status report, BSR, a new medium access control control element, a service data adaptation protocol control protocol data unit, a packet data convergence protocol control protocol data unit, a radio link control control protocol data unit, or a connection resume message. In some example embodiments, the indication via the BSR may be transmitted in the SDT procedure.

According to certain example embodiments, the indicating to the network element the result of the determining may be performed by transmitting a new radio resource control, RRC, message. According to some example embodiments, the new RRC message may be multiplexed with the SDT data when the SDT procedure is triggered. According to other example embodiments, the indicating to the network element, the result of the determining may include indicating presence of the SDT data and the non-SDT data. According to further example embodiments, the presence of the SDT data and the non-SDT data may be indicated in a BSR information.

In certain example embodiments, the method may further include buffering the SDT data and the non-SDT data. In some example embodiments, when the non-SDT data is available, the method may further include aborting the SDT procedure, and triggering the connection resume procedure. In other example embodiments, the aborting may be based on a priority of the SDT data or whether the SDT data has already been transmitted. In further example embodiments when the non-SDT data is available, the method may also include buffering the non-SDT data while the SDT procedure is ongoing.

According to certain example embodiments, after the SDT procedure is completed, the method may further include triggering a connection resume procedure for the non-SDT data transmission. According to some example embodiments, the method may also include buffering the SDT data and the non-SDT data, and initiating the SDT procedure while the non-SDT data is buffered. According to other example embodiments, the method may further include transmitting the SDT data to the network element while the non-SDT data is buffered.

Figure 8:
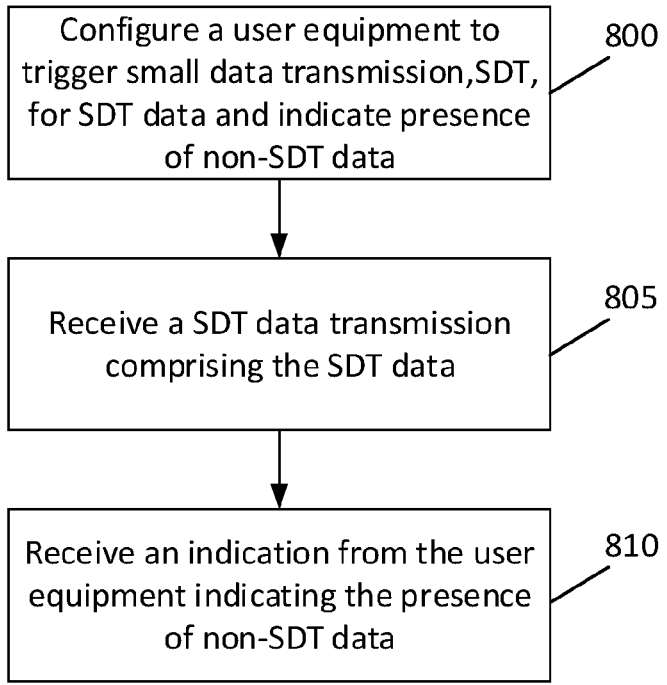
FIG. 8 illustrates a flow diagram of another method, according to certain example embodiments.

FIG. 8 illustrates a flow diagram of another method, according to certain example embodiments. In certain example embodiments, the flow diagram of FIG. 8 may be performed by a telecommunications network, network entity or network node in a 3GPP system, such as LTE or 5G-NR. For instance, in an example embodiment, the method of FIG.

Figure 9A:
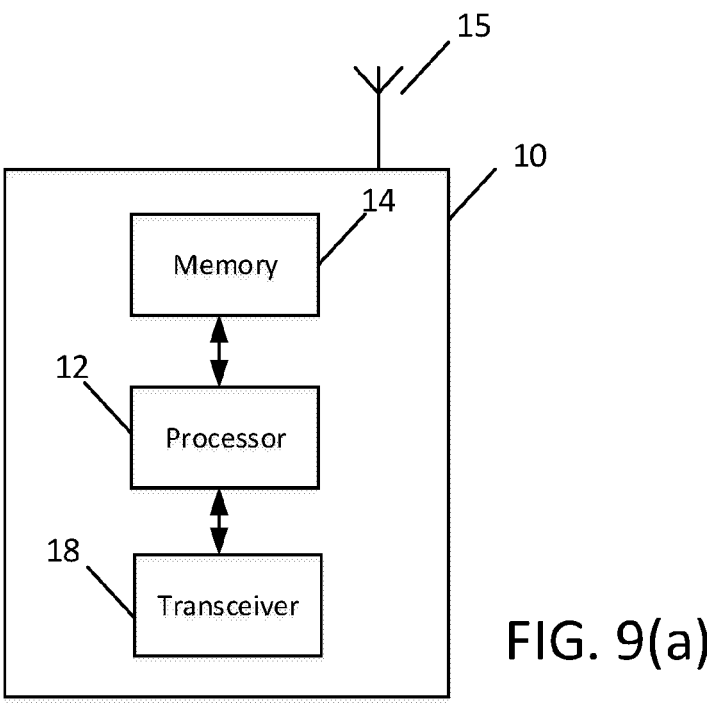
FIG. 9($a$) illustrates an apparatus, according to certain example embodiments.
Figure 9B:
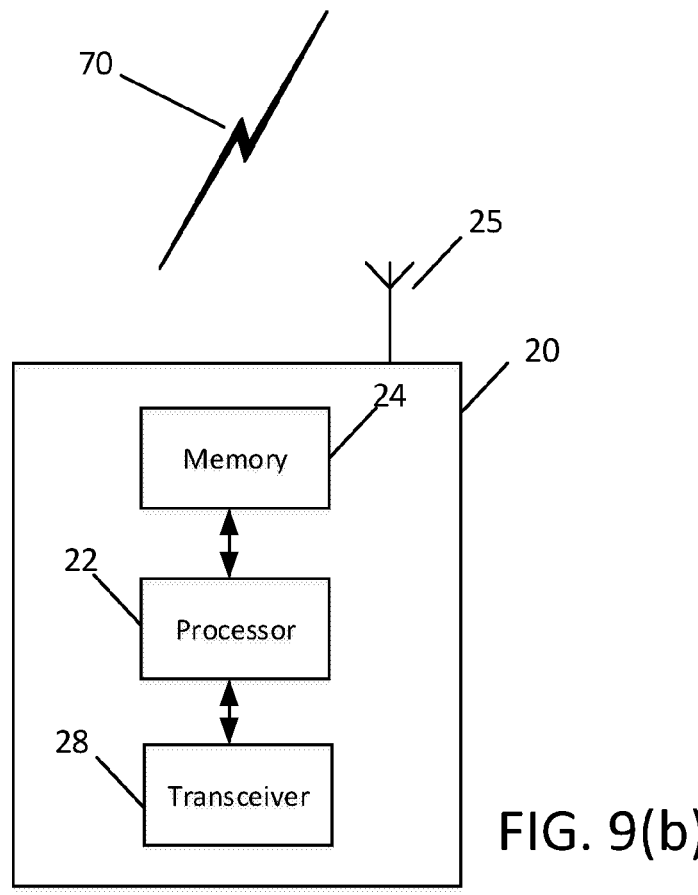

8 may be performed by a gNB, for instance similar to apparatuses 10 or 20 illustrated in FIGS. 9(a) and 9(b).

According to certain example embodiments, the method of FIG. 8 may include, at 800, configuring a user equipment to trigger small data transmission, SDT, for SDT data and indicate presence of non-SDT data. The method may also include, at 805, receiving a SDT data transmission comprising the SDT data. The method may further include, at 810, receiving an indication from the user equipment indicating the presence of non-SDT data.

According to certain example embodiments, the configuring of the user equipment may be performed via a radio resource control, RRC, message. According to some example embodiments, the RRC message may trigger the user equipment to move from a RRC connected state to a RRC inactive state. According to other example embodiments, the indication of the presence of non-SDT data is received via one of a buffer status report, BSR, a new medium access control control element, a service data adaptation protocol control protocol data unit, a packet data convergence protocol control protocol data unit, a radio link control control protocol data unit, or a connection resume message. According to further example embodiments, the indication via the BSR may be received in an SDT procedure.

In certain example embodiments, the configuring the user equipment may include configuring the user equipment about what indication related to the presence of non-SDT data it should report, and when or whether to trigger such report. In some example embodiments, the method may further include configuring the user equipment to initiate a SDT to transmit allowed uplink SDT data. In other example embodiments, the configuring the user equipment comprises one or more of configuring the user equipment not to send the indication for non-SDT data, configuring the user equipment to send the indication for a subset of non-SDT data, configuring the user equipment to cancel or postpone an ongoing trigger to resume a RRC connection whenever a trigger to initiate an SDT is satisfied, configuring the user equipment with allowed SDT data for SDT, or configuring the user equipment to abort the SDT in the presence of both SDT data and non-SDT data.

FIG. 9(a) illustrates an apparatus 10 according to certain example embodiments. In certain example embodiments, apparatus 10 may be a node or element in a communications network or associated with such a network, such as a UE, mobile equipment (ME), mobile station, mobile device, stationary device, IoT device, or other device. In other example embodiments, apparatus 10 may be a network element, node, host, server in a communication network or serving such a network. It should be noted that one of ordinary skill in the art would understand that apparatus 10 may include components or features not shown in FIG. 9(a).

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 9(a).

As illustrated in the example of FIG. 9(a), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 9(*a*), multiple processors may be utilized according to other example embodiments. For example, it should be understood that, in certain example embodiments, apparatus may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-7.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-7.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

As discussed above, according to certain example embodiments, apparatus 10 may be a UE, for example. According to certain example embodiments, apparatus 10 may be controlled by memory 14 and processor 12 to perform the functions associated with example embodiments described herein. For instance, in certain example embodiments, apparatus 10 may be controlled by memory 14 and processor 12 to determine an availability of non-small data transmission, non-SDT, data. Apparatus 10 may also be controlled by memory 14 and processor 12 to indicate to a network element, a result of the determining.

FIG. 9(*b*) illustrates an apparatus 20 according to certain example embodiments. In certain example embodiments, the apparatus 20 may be a node or element in a communications network or associated with such a network, such as a base station, a Node B, an evolved Node B (eNB), 5G Node B or access point, next generation Node B (NG-NB or gNB), and/or WLAN access point, associated with a radio access network (RAN), such as an LTE network, 5G or NR. It should be noted that one of ordinary skill in the art would understand that apparatus 20 may include components or features not shown in FIG. 9(*b*)

As illustrated in the example of FIG. 9(*b*), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 9(*b*), multiple processors may be utilized according to other example embodiments. For example, it should be understood that, in certain example embodiments, apparatus may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-6 and 8.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-6 and 8.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a network element, node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. According to certain embodiments, apparatus may be controlled by memory 24 and processor 22 to perform the functions associated with any of the embodiments described herein.

As discussed above, according to certain example embodiments, apparatus 20 may be a communication network, for example. According to certain embodiments, apparatus 20 may be controlled by memory 14 and processor 12 to perform the functions associated with example embodiments described herein. For instance, in certain example embodiments, apparatus 20 may be controlled by memory 24 and processor 22 to configure a user equipment to trigger small data transmission, SDT, for SDT data and indicate presence of non-SDT data. Apparatus 20 may also be controlled by memory 24 and processor 22 to receive a SDT data transmission comprising the SDT data. Apparatus 20 may further be controlled by memory 24 and processor 22 to receive an indication from the user equipment indicating the presence of non-SDT data.

Further example embodiments may provide means for performing any of the functions or procedures described herein. For example, certain example embodiments may be directed to an apparatus that includes means for determining an availability of non-small data transmission, non-SDT, data. The apparatus may also include means for indicating to a network element, a result of the determining.

Other example embodiments may be directed to a further apparatus that includes means for configuring a user equipment to trigger small data transmission, SDT, for SDT data and indicate presence of non-SDT data. The apparatus may also include means for receiving a SDT data transmission comprising the SDT data. The apparatus may further include means for receiving an indication from the user equipment indicating the presence of non-SDT data.

Certain example embodiments described herein provide several technical improvements, enhancements, and/or advantages. In some example embodiments, it may be possible to provide signaling extensions to handle cases of concurrent presence of SDT and non-SDT data. It may also be possible to prevent the occurrence of extra delays whenever the data is generated in conjunction with SDT-DRB data. Certain example embodiments may also provide means for the UE in RRC_inactive state to handle cases where SDT and non-SDT data may be simultaneously present in the UE's buffer at the time it is initiating a SDT. In some examples, the handling may take into account data priorities and data type (e.g., depending on the type of application that generated the data including non-smartphone applications such as sensors and smart meters as well as smartphone applications).

A computer program product may include one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary

5GS 5G System
AMF Access and Mobility Management Function
SSR Buffer Status Report
CG Configured Grant
CP Control Plane
DRB Data Radio Bearer
eNB Enhanced Node B
gNB 5G or Next Generation NodeB
I-RNTI Inactive Radio Network Temporary Identifier
LCG Logical Channel Group
LCH Logical Channel
LTE Long Term Evolution
NCC nextHopChainingCount
NG-RAN Next Generation-Radio Access Network
NR New Radio
NW Network
PDU Protocol Data Unit
PRACH Physical Random Access Channel
RACH Random Access Channel
RAN Radio Access Network
RB Radio Bearer
RNA RAN Notification Area
RNAU RAN Notification Area Update
RRC Radio Resource Control
SDT Small Data Transmission
UE User Equipment
UP User Plane
Xn Xn Network Interface

We claim:

1. A method, comprising:

determining during a small data transmission (SDT) procedure with a network element, availability of data for transmission on a data radio bearer (DRB) not configured for SDT, wherein, when the data for transmission on the DRB not configured for SDT is available, the method further comprises:

indicating to the network element while the SDT procedure is ongoing, that the data is available for transmission on the DRB not configured for SDT; and aborting the SDT procedure.

2. A method, comprising:

configuring a user equipment to trigger small data transmission (SDT) for data available for transmission on a data radio bearer (DRB) configured for SDT and indicate presence of data available for transmission on a DRB not configured for SDT;

receiving a SDT data transmission comprising the data available on the DRB configured for SDT; and receiving an indication from the user equipment indicating the presence of the data available for transmission on the DRB not configured for SDT, wherein the configuring the user equipment comprises configuring the user equipment to abort the SDT procedure in the presence of both the data available for transmission on the DRB configured for SDT and the data available for transmission on the DRB not configured for SDT.

3. An apparatus, comprising:
at least one processor; and
at least one memory storing instructions that, when executed by the at least one processor, cause the apparatus at least to:
determine during a small data transmission (SDT) procedure with a network element, availability of data for transmission on a data radio bearer (DRB) not configured for SDT; and
wherein, when the data for transmission on the DRB not configured for SDT is available, the instructions, when executed by the at least one processor, cause the apparatus at least to:
indicate to the network element while the SDT procedure is ongoing, that the data is available for transmission on the DRB not configured for SDT; and
abort the SDT procedure.

4. The apparatus according to claim 3, wherein the instructions, when executed by the at least one processor, cause the apparatus at least to:
determine availability of data for transmission on a DRB configured for SDT; and
trigger the SDT procedure when the data for transmission on the DRB configured for SDT is determined to be available.

5. The apparatus according to claim 4, wherein the instructions, when executed by the at least one processor, cause the apparatus at least to:
perform an SDT to the network element with the data for transmission on the DRB configured for SDT.

6. The apparatus according to claim 4,
wherein the indication to the network element that the data is available for transmission on the DRB not configured for SDT is performed by transmitting a radio resource control (RRC) message, and
wherein the RRC message is multiplexed with the data of the DRB configured for SDT.

7. The apparatus according to claim 4,
wherein when indicating to the network element that the data is available for transmission on the DRB not configured for SDT, the instructions, when executed by the at least one processor, cause the apparatus at least to indicate presence of the data for transmission on the DRB configured for SDT and the data for transmission on the DRB not configured for SDT, and
wherein the presence of the data for transmission on the DRB configured for SDT and the data for transmission on the DRB not configured for SDT is indicated in a BSR information.

8. The apparatus according to claim 4, wherein the instructions, when executed by the at least one processor, cause the apparatus at least to:
buffer the data for transmission on the DRB configured for SDT and the data for transmission on the DRB not configured for SDT.

9. The apparatus according to claim 3, wherein the instructions, when executed by the at least one processor, cause the apparatus at least to:
trigger a connection resume procedure when the data for transmission on the DRB not configured for SDT is determined to be available.

10. The apparatus according to claim 3,
wherein when indicating to the network element that the data is available for transmission on the DRB not configured for SDT, the instructions, when executed by the at least one processor, cause the apparatus at least to indicate presence of the data in a buffer of the DRB not configured for SDT, and
wherein presence of the data in the buffer is indicated during the SDT procedure.

11. The apparatus according to claim 3, wherein the indicating to the network element that the data is available for transmission on the DRB not configured for SDT is performed via one of a buffer status report (BSR) a new medium access control control element, a service data adaptation protocol control protocol data unit, a packet data convergence protocol control protocol data unit, a radio link control control protocol data unit, or a connection resume message, and
wherein the indicating via the BSR is performed in the SDT procedure.

12. The apparatus according to claim 3, wherein the aborting is based on a priority of the data for transmission on the DRB configured for SDT or whether the data for transmission on the DRB configured for SDT has already been transmitted.

13. The apparatus according to claim 3, wherein, when the data for transmission on the DRB not configured for SDT is available, the instructions, when executed by the at least one processor, cause the apparatus at least to:
buffer the data for transmission on the DRB not configured for SDT while the SDT procedure is ongoing.

14. The apparatus according to claim 13, wherein, after the SDT procedure is completed, the instructions, when executed by the at least one processor, cause the apparatus at least to:
trigger a connection resume procedure for the data for transmission on the DRB not configured for SDT.

15. An apparatus, comprising:
at least one processor; and
at least one memory storing instructions that, when executed by the at least one processor, cause the apparatus at least to:
configure a user equipment to trigger small data transmission (SDT) for data available for transmission on a data radio bearer (DRB) configured for SDT and indicate presence of data available for transmission on a DRB not configured for SDT;
receive a SDT data transmission comprising the data available on the DRB configured for SDT; and
receive an indication from the user equipment indicating the presence of the data available for transmission on the DRB not configured for SDT,
wherein the configuring the user equipment comprises configuring the user equipment to abort the SDT procedure in the presence of both the data available for transmission on the DRB configured for SDT and the data available for transmission on the DRB not configured for SDT.

16. The apparatus according to claim 15, wherein the configuration of the user equipment is performed via a radio resource control (RRC) message.

17. The apparatus according to claim 16, wherein the RRC message triggers the user equipment to move from a RRC connected state to a RRC inactive state.

18. The apparatus according to claim 15, wherein the indication of the presence of the data available for transmission on the DRB not configured for SDT is received via one of a buffer status report (BSR), a new medium access control control element, a service data adaptation protocol control protocol data unit, a packet data convergence protocol control protocol data unit, a radio link control control protocol data unit, or a connection resume message, and wherein the indication via the BSR is received in an SDT procedure.

19. The apparatus according to claim 15, wherein when configuring the user equipment, the instructions, when executed by the at least one processor, cause the apparatus at least to configure the user equipment about what indication related to the presence of the data available for transmission on the DRB not configured for SDT it should report, and when or whether to trigger such report.

20. The apparatus according to claim 15, wherein the instructions, when executed by the at least one processor, cause the apparatus at least to:

configure the user equipment to initiate a SDT to transmit allowed uplink SDT data.

21. The apparatus according to claim 15, wherein the indication is received by a RRC message that is multiplexed with the data of the DRB configured for SDT.

22. A non-transitory computer readable medium comprising program instructions that, when executed by an apparatus, cause the apparatus to perform at least the following:

determining during a small data transmission (SDT) procedure with a network element, availability of data for transmission on a data radio bearer (DRB) not configured for SDT, wherein, when the data for transmission on the DRB not configured for SDT is available, the program instructions, when executed by the apparatus, cause the apparatus to perform at least the following:

indicating to the network element while the SDT procedure is ongoing, that the data is available for transmission on the DRB not configured for SDT; and aborting the SDT procedure.

23. A non-transitory computer readable medium comprising program instructions that, when executed by an apparatus, cause the apparatus to perform at least the following:

configuring a user equipment to trigger small data transmission (SDT) for data available for transmission on a data radio bearer (DRB) configured for SDT and indicate presence of data available for transmission on a DRB not configured for SDT;

receiving a SDT data transmission comprising the data available on the DRB configured for SDT; and receiving an indication from the user equipment indicating the presence of the data available for transmission on the DRB not configured for SDT, wherein the configuring the user equipment comprises configuring the user equipment to abort the SDT procedure in the presence of both the data available for transmission on the DRB configured for SDT and the data available for transmission on the DRB not configured for SDT.

* * * * *